United States Patent [19]

Michel et al.

[11] 4,202,075
[45] May 13, 1980

[54] DEVICE FOR FILLING A SHIRRED TUBULAR CASING

[75] Inventors: Wolfgang Michel; Reinhold Becker, both of Wiesbaden, Fed. Rep. of Germany

[73] Assignee: Hoechst Aktiengesellschaft, Frankfurt am Main, Fed. Rep. of Germany

[21] Appl. No.: 902,413

[22] Filed: May 3, 1978

[30] Foreign Application Priority Data

Mar. 4, 1978 [DE] Fed. Rep. of Germany ....... 2809385

[51] Int. Cl.² ............................................. A22C 11/02
[52] U.S. Cl. ...................................................... 17/41
[58] Field of Search .......................... 17/35, 41, 42, 33; 141/313, 314, 317

[56] References Cited

U.S. PATENT DOCUMENTS

| 3,115,668 | 12/1963 | Townsend | 17/33 |
|---|---|---|---|
| 3,264,679 | 8/1966 | Moekle | 17/33 |
| 3,457,588 | 7/1969 | Myles et al. | |
| 3,473,190 | 10/1969 | Kielsmeier et al. | 17/41 |
| 3,553,768 | 1/1972 | Wilmsen | 17/35 |
| 3,621,513 | 11/1971 | Kupcikevicius | 17/41 |
| 3,739,426 | 6/1973 | Schnell | 17/33 |
| 3,748,690 | 7/1973 | Niedecker | 17/33 |
| 3,751,764 | 8/1973 | Dobbert | 17/41 X |
| 3,808,638 | 5/1974 | Kupcikevicius et al. | 17/35 |
| 3,885,053 | 5/1975 | Townsend | 426/276 |
| 3,892,009 | 1/1975 | Townsend | 17/35 |
| 3,949,446 | 4/1976 | Smith | 17/41 |
| 3,964,128 | 6/1976 | Townsend et al. | 17/33 |
| 3,971,101 | 7/1976 | Townsend et al. | 17/33 |
| 3,975,795 | 8/1976 | Kupcikevicius et al. | 17/41 |
| 4,007,761 | 2/1977 | Beckman | 138/118.1 X |
| 4,013,099 | 3/1977 | Gerigk et al. | 138/109 |
| 4,017,941 | 4/1977 | Raudys et al. | 17/41 |
| 4,028,775 | 6/1977 | Tysver | 17/49 |
| 4,044,426 | 8/1977 | Kupcikevicius et al. | 17/41 X |
| 4,064,673 | 12/1977 | Gerigk et al. | 17/41 X |
| 4,077,090 | 3/1978 | Frey et al. | 17/41 |

FOREIGN PATENT DOCUMENTS

| 1148905 | 5/1963 | Fed. Rep. of Germany | 17/41 |
|---|---|---|---|
| 1177029 | 8/1964 | Fed. Rep. of Germany | 17/41 |
| 2330064 | 5/1977 | France | 17/41 |
| 2350789 | 5/1977 | France | 17/41 |

Primary Examiner—Willie G. Abercrombie
Attorney, Agent, or Firm—Schwartz, Jeffery, Schwaab, Mack, Blumenthal & Koch

[57] ABSTRACT

Disclosed is a calibrating device for expanding and controlling the draw-off speed of a shirred tubular casing 4a from the stuffing horn 1 of a stuffing machine during the filling thereof. This device comprises a hollow calibrating pipe 2 having a central bore therethrough for mounting on the stuffing horn 1 of a stuffing machine, and an enlarged circumference 8 at one end thereof which applies a frictional force to the tubular casing 4 as the casing is drawn over the pipe during filling. At least the enlarged end 8 of the pipe 2, moreover, is made of a resilient material to provide this area with a variable circumference to eliminate damage to the casing due to variations in the size thereof. Means 3 are also provided for adjusting the effective circumference of the enlarged end 8 of the pipe 2.

17 Claims, 4 Drawing Figures

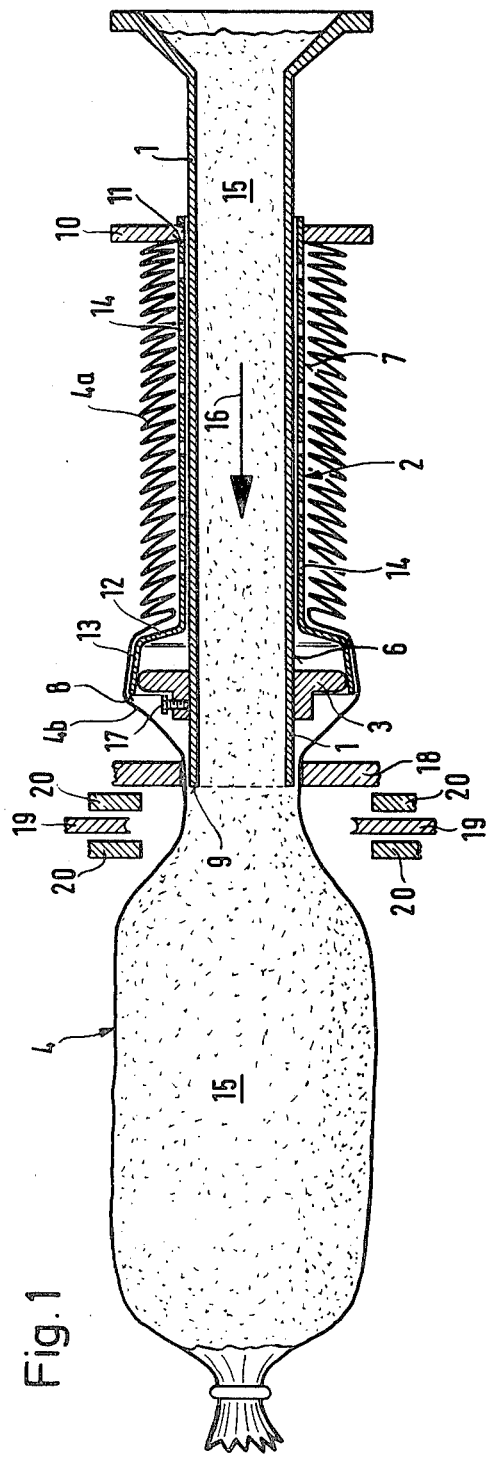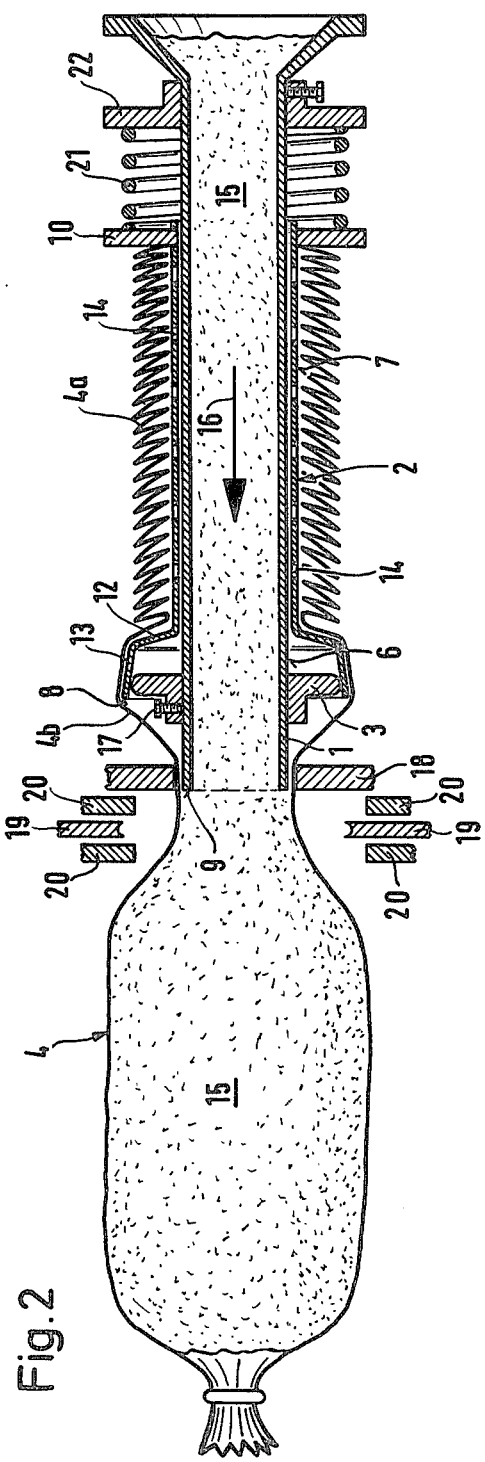

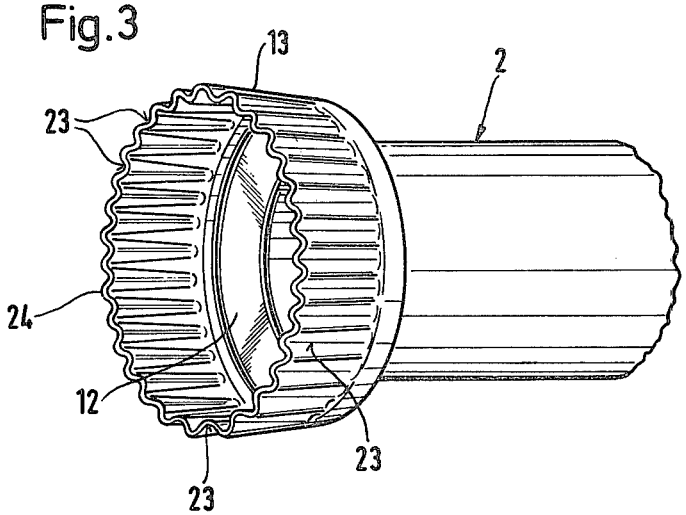
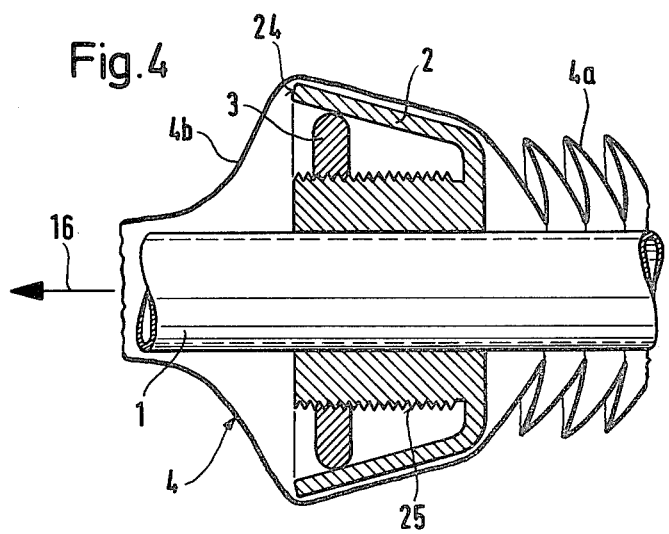

DEVICE FOR FILLING A SHIRRED TUBULAR CASING

BACKGROUND OF THE INVENTION

The present invention relates to a device for use with shirred tubular casing stuffing machines for stuffing casings having a uniform diameter. It particularly relates to a device which is adapted to be mounted on the stuffing horn of such machines for uniformly controlling the filling of shirred tubular casings by pre-expanding the casing prior to filling and controlling the draw-off speed of the casing from the stuffing horn.

It is known to use shirred tubular casings of synthetic, semi-synthetic, or natural materials for packaging food products, such as meat, in the form of sausages. The shirred casings utilized for this purpose, also called "sticks" or "hollow rods" by those skilled in the art, are produced by shirring and compressing long tubes of casing in the direction of their longitudinal axis to approximately 1 to 3% of their original length. In order to fill the shirred casing with sausage composition or other food product, conventionally one end of the shirred casing is first closed, and then the shirred casing is normally fit onto the stuffing horn of a sausage machine. A sausage mixture is next forced, under pressure, through the stuffing horn into the casing, by which the shirred casing is continuously deshirred. After a certain predetermined length of the casing has been filled, the filled sausage casing is subdivided into cylindrical sausages which are then tied off and closed.

It is desirable that the cross-section of the sausages thus produced remains constant over their entire length. Optimum filling of the tubular casing requires that a uniform diameter, the size of which is dependent upon the particular casing utilized or the length of the sausage, be maintained over the entire length of the casing. If the casing is overstuffed, it may burst, whereas an insufficiently filled sausage displays a wrinkled surface.

Heretofore, the prior art has developed several devices for uniformly controlling the diameter of the tubular casing during filling with sausage mixtures or other food products. Thus, it is conventional to fit to the opening of the stuffing horn of the sausage machine a calibrating means which prestretches the casing to be filled by pressing against the inside wall thereof. Due to this pressure, frictional forces are developed between the calibrating means and the inside wall of the casing by which the withdrawal of the casing from the stuffing horn is slowed down (U.S. Pat. No. 3,457,588). Suitable calibrating means which have been heretofore used in the prior art, for example, comprise resilient fingers disposed at the rim of the opening of the stuffing horn, which are produced by forming slits therein (U.S. Pat. No. 3,264,697). These fingers press against the internal wall of the casing and thus enlarge it. By drawing the casing over these fingers during the filling process, a frictional resistance occurs which controls the draw-off speed of the casing from the stuffing horn. This device has the disadvantage, however, that the frictional resistance cannot be adjusted for use with different sized casings. Moreover, it involves the risk that the casing may be damaged by the outspread fingers.

It has also been proposed to pre-pack the shirred tubular casing with a calibrating disc and to attach this combination to the stuffing horn prior to the filling operation (U.S. Pat. No. 4,007,761). The calibrating disc is disposed within an unshirred section of the casing and has an outer perimeter which is preferably larger than the internal circumference of the unshirred casing. During filling, the casing is drawn over the calibrating disc and is thereby stretched. In this device, the calibrating disc must consist of a non-resilient material in order to prevent its diameter from being altered by the pressure exerted by the casing in contact therewith.

The use of an inelastic calibrating disc has the disadvantage that due to variations in the circumference of the casing—which cannot be entirely avoided during manufacture—an optimum filling of the casing is not achieved. If the size of the casing is too small, the casing may be damaged by the calibrating disc or even torn off; at a minimum an undesirably high friction will occur between the casing and the calibrating disc, leading to overstuffing of the casing with sausage mixture and the inability to withstand the high pressures formed during boiling of the sausage. On the other hand, if the diameter of the casing exceeds a certain optimum size, the casing will be drawn too fast over the calibrating disc and thus will not be sufficiently filled with sausage composition.

SUMMARY OF THE INVENTION

Accordingly, it is an object of the present invention to provide a calibrating device for use with a tubular casing stuffing machine for uniformly controlling the filling of a shirred tubular casing which eliminates damage and/or overstuffing of the casing due to variations in casing circumference.

It is an additional object of the present invention to provide a calibrating device in which the amount of frictional resistance between the calibrating device and the inside wall of a deshirred tubular casing can be adjusted without resorting to different sized calibrating devices.

In accomplishing the foregoing and other objects, there has been provided in accordance with the present invention a calibrating device for use with a stuffing machine having a stuffing horn for uniformly controlling the filling of a shirred tubular casing with a food composition flowing under pressure from the stuffing horn. This device comprises a hollow calibrating pipe having a central bore therethrough for mounting the calibrating pipe on the stuffing horn of the stuffing machine, and having an enlarged end, at least the enlarged end of the calibrating pipe being formed of a resilient material. During filling of a casing, the resilient enlarged end of the calibrating pipe stretches and applies a frictional force to the casing, as the casing is drawn over the calibrating pipe by the pressure of the food composition being forced thereinto, by which the draw-off speed of the casing from the stuffing horn and concomitantly the filling of the casing is controlled. The use of a resilient material in the enlarged end of the calibrating pipe provides the enlarged end thereof with a variable circumference which feature mitigates damage due to variations in the casing diameter. The normal circumference of the enlarged end of the calibrating pipe is larger than the inner circumference of the unshirred unstretched tubular casing in order that sufficient frictional force may be applied thereto by the calibrating pipe. Preferably, the enlarged end also has a maximum circumference which is smaller or equal to the desired circumference of the unshirred, filled casing.

In one embodiment, the calibrating pipe comprises a first portion having a circumference corresponding to the inner circumference of the shirred tubular casing and an enlarged end portion. In a second embodiment, the calibrating pipe has a circumference which increases continuously from one end to the other, the end of smaller circumference having a circumference corresponding to the inner circumference of the shirred tubular casing. Preferably, moreover, the enlarged end portion is flared out. For filling different sized casings, calibrating pipes having different circumferences are employed.

In the preferred embodiment, the calibrating device of the instant invention further comprises means for adjustably varying the circumference of the enlarged end of the calibrating pipe. This feature enables the frictional force applied by the calibrating pipe to be adjusted to a desired value without the necessity for employing a calibrating pipe of different circumference. Preferably, this circumference varying means comprises an annular sizing element which engages the inner surface of the resilient enlarged end of the calibrating pipe with a variable contact pressure and co-acts therewith to control its size.

Other objects, features, and advantages of the present invention will become apparent to the skilled artisan upon examination of the following detailed description of the present invention, taken in conjunction with the figures of drawing.

BRIEF DESCRIPTION OF THE DRAWINGS

FIG. 1 is a sectional side view of the calibrating device according to the instant invention;

FIG. 2 illustrates the device shown in FIG. 1, with a pressure spring for biasing the calibrating pipe into contact with the circumference varying means;

FIG. 3 is a perspective view of a first embodiment of the calibrating pipe with an enlarged opening; and, FIG. 4 is a sectional view of a second embodiment of the calibrating pipe of the instant invention.

DETAILED DESCRIPTION OF THE PREFERRED EMBODIMENTS

The object of the present invention is to provide a device which does not exhibit the disadvantages of the known calibrating devices and which allows the amount of prestretching of the deshirred tubular casing to be adjusted without resort to different sized calibrating devices.

The tubular casing suitable for use with the device of the instant invention comprises any of the materials conventionally used for the manufacture of food casings, for example, regenerated cellulose, collagen, or synthetic sausage skin.

The present invention provides a calibrating device which uniformly controls the filling of a tubular casing by stretching the deshirred tubular casing prior to filling with sausage composition, and by controlling the draw-off speed of the casing from the stuffing horn. This device comprises a hollow calibrating pipe with an enlarged end made of a resilient material. In the preferred embodiment, this device further comprises an annular sizing element which is adjustably pressed into engagement with the inner surface of the enlarged end of the calibrating pipe by which the circumference of the enlarged end of the calibrating pipe may be varied. Moreover, both of these members have a central bore therethrough by which they may be mounted on the stuffing horn of a stuffing machine. Through the use of a calibrating pipe with a flexible enlarged end and an annular sizing element which co-acts therewith, the circumference of the calibrating pipe may be adjusted so that a single such device can be used with a larger number of different sized casings. Moreover, the use of flexible material in the calibrating pipe provides the enlarged end thereof with a variable circumference which feature mitigates damage due to variations in casing diameter.

In one embodiment, the calibrating pipe comprises a first portion having a circumference corresponding to the inner circumference of the shirred casing, and an enlarged end portion having a larger circumference. The length of the calibrating pipe is preferably selected such that the entire length of the shirred tubular casing may be supported thereon. The casing is preferably secured to the smaller end of the calibrating pipe by, for example, an abutment connected with the calibrating pipe. The abutment may comprise a sleeve or a ring having a central bore by which it may be fit onto the smaller end of the calibrating pipe and fastened thereto, for example, by projections on the outside of the calibrating pipe or by means of an adhesive. In this embodiment of the present invention, the calibrating pipe further functions as a supporting sleeve for the tubular casing.

If a thorough wetting of the casing is required prior to the filling operation—the necessity for which is primarily dependent on the material of which the casing is made—the casing is advantageously wet while it is fixed on the calibrating pipe. To enable water to penetrate quickly to the inside of the tubular casing, the calibrating pipe may be provided with perforations, which may take the form of punched-out round holes.

In use, the shirred casing is first fit onto the calibrating pipe. The calibrating pipe with attached casing is then pushed onto the stuffing horn of a conventional apparatus for filling tubular casings with sausage mixture.

In another embodiment of the device according to the instant invention, a short calibrating pipe is provided which has a length which is insufficient to carry the tubular shirred casing. In this embodiment of the invention, the circumference of the calibrating pipe increases continuously from one end of the pipe to the other, and achieves its maximum circumference at the end of the pipe which is adjacent to the opening of the stuffing horn. In the use of this embodiment of the instant invention, the tubular casing is first pulled onto the stuffing horn. The calibrating pipe is then pushed by its un-enlarged opening onto the stuffing horn. Finally, a deshirred portion of the tubular casing is drawn over the enlarged opening of the calibrating pipe. This arrangement has the advantage that the calibrating pipe need not be installed until immediately before the filling operation.

In order to successfully practice the present invention, the end of the calibrating pipe adjacent to the opening of the stuffing horn must have an enlarged circumference, which is preferably flared out. In a particularly preferred embodiment of the invention, the portion of enlarged circumference comprises a flange which projects outwardly at a substantially right angle and has a cylindrical section of pipe connected thereto which flares out from the flange in the direction of the end of the calibrating pipe. The enlarged end of the calibrating pipe has a circumference which is preferably larger than the inner circumference of the deshirred unstretched casing in order that a sufficient frictional force may be applied thereto. Preferably, the maximum circumference of the enlarged opening of the calibrating pipe is smaller than or equal to the desired circumference of the unshirred tubular casing in its filled form.

The circumference varying means utilized with the instant calibrating pipe comprises an annular sizing element, preferably a disc with a circular cross-section having a central bore and rounded outer edges, which is fit onto the stuffing horn and is pressed into engagement with the enlarged end of the calibrating pipe. The circumference of the annular sizing element is smaller than the maximum inner circumference of the enlarged opening of the calibrating pipe, so that the annular sizing element contacts the inside surface of the enlarged end of the calibrating pipe, thereby controlling the size thereof. Increased pressure of the sizing element against the enlarged end of the calibrating pipe correspondingly increases the circumference of the enlarged end. To enable the size of the calibrating pipe to be adjusted in this fashion, the calibrating pipe, or at least the effective, i.e., enlarged, portion of the calibrating pipe, must be comprised of resilient i.e., elastic or stretchable, material, such as, for example, resilient rubber, thermoformed polyvinyl chloride, or polystyrene. To maintain the desired size of the enlarged end of the calibrating element, the annular sizing element is secured in its desired position by fastening to the stuffing horn.

The adjustement of the circumference of the calibrating pipe may be further enhanced by providing the enlarged end of the calibrating pipe with an undulating profile or with indentations. With the use of this feature, the undulated surface is straightened out or the indentations are spread out when the annular sizing element is pressed against the enlarged end of the calibrating pipe, enabling a relatively greater change in magnitude of the circumference of the calibrating pipe to occur than if a smooth surfaced calibrating pipe is utilized.

In a particularly advantageous embodiment of the instant invention, the above described cylindrical, flared end of the calibrating pipe is provided with parallel elevations and/or depressions, thus resulting in an undulating profile extending parallel to the axis of the calibrating pipe. When the annular sizing element is pressed against this undulating section of the pipe, the profile is expanded from its contracted condition, thereby enlarging the circumference of the calibrating pipe in this section.

The calibrating pipe and the annular sizing element are maintained in engagement with each other by fastening the calibrating pipe and the annular sizing element to the stuffing horn, for example, by means of a slide lock, or by screwing each of these members onto threads which are provided on the stuffing horn and allow a fine adjustment of the pressure and, consequently, of the enlargement of the pipe. Alternatively, resilient elements may be utilized to bias the two calibrating elements into engagement.

In a particularly advantageous embodiment of the present invention, the sizing element is maintained in contact with the calibrating pipe by means of a thread which is advantageously an integral portion of the calibrating pipe. For example, the thread may be disposed on a tubular extension which has the same diameter as the calibrating pipe and protrudes from the enlarged end of the calibrating pipe. By this means, the annular sizing element may be screwed on the thread into the enlarged opening of the calibrating pipe, the relative position of the sizing element within the enlarged end determining the circumference of the enlarged resilient end.

Alternatively, only the annular calibrating element need be fastened to the stuffing horn. In this case, the calibrating pipe will be pressed against the annular sizing element by the tension exerted by the casing as it is drawn off the stuffing horn.

However, it is to be noted that it is possible to perform the filling operation without the use of the annular sizing element. In this embodiment, the enlargement of the tubular casing depends on the circumference of the enlarged end of the calibrating pipe, and a change in the enlargement of the casing is achieved by substituting calibrating pipes of different circumference for one another.

In use, the tubular casing is pulled over the enlarged end of the calibrating pipe, over the annular sizing element if one is employed, and over the opening of the stuffing horn, and is thus deshirred. The opening of the tubular casing is then closed in a normal manner, for example, by a clip closing apparatus, and filling is begun. The pressure under which the sausage mixture is forced through the stuffing horn into the tubular casing continuously pulls the casing over the enlarged end of the calibrating pipe. After passing over the calibrating device of the instant invention, the tubular casing is conveyed through conventional machine elements, for example, additional braking means by which the diameter of the casing is reduced, and a linking and cutting station.

Referring to the drawings, in which units performing the same function are designated by the same reference numbers, the calibrating device of the instant invention is shown in position on the stuffing horn of a stuffing machine.

In FIG. 1, the stuffing horn 1 of a sausage machine, has a calibrating pipe 2 and an annular sizing element 3 disposed on its outer surface.

The calibrating pipe 2 surrounds the outer surface of the stuffing horn 1 and is of sufficient length to carry the entire length of the shirred tubular casing. The end 8 of the calibrating pipe 2, adjacent to the opening 9 of the stuffing horn, has an enlarged circumference and a deshirred portion 4b of the tubular casing 4 is drawn over the enlarged end 8 of the calibrating pipe. The annular sizing element 3, illustrated in the form of a disc with a circular cross-section, a central bore, and rounded circumferential edges, has a circumference which is smaller than the maximum circumference of the enlarged end 8 of the calibrating pipe.

The shirred portion 4a of the tubular casing is fixed by an annular abutment 10 whose projections engage depressions 11 in the calibrating pipe 2.

The enlarged end 8 of the calibrating pipe 2 comprises an outwardly protruding flange 12 and, connected thereto a cylindrical, flared-out wall 13 which diverges in the direction of the end 8 of the calibrating pipe. Perforations 14 in the calibrating pipe 2 facilitate a preliminary wetting of the casing 4.

The sausage composition 15 is pressed in the direction of the arrow 16 into the tubular casing 4, the force of which draws the casing off the stuffing horn over the enlarged end 8 of the calibrating pipe 2. During this operation, the calibrating pipe 2 is forced against the annular sizing element 3 which is adjustably positioned on the stuffing horn 1 by a screw 17. The deshirred tubular casing 4b then passes through further braking elements 18, cutting station 19, and tying station 20 shown diagrammatically in the figure.

In FIG. 2, a spring 21 and an adjustable abutment 22 are provided for biasing the calibrating pipe 2 against the sizing element 3.

In FIG. 3, another embodiment of the calibrating pipe 2 is illustrated. The calibrating pipe 2 comprises flange 12 and cylindrical, flared-out wall 13 having depressions 23 which extend parallel to each other and form a profile of waves parallel to the axis of the calibrating pipe 2. The depressions are wedge-shaped and widen in the direction of the opening 24 of the calibrating pipe 2.

In FIG. 4, a further embodiment of the calibrating pipe 2 is disclosed in which the circumference of the calibrating pipe increases continuously from the end opposite the opening 24 to the open end 24, where it reaches its maximum circumference. Further, the calibrating pipe 2 is provided with a thread 25 on which the annular sizing element 3 is adjustably displaceable. During the filling operation, a shirred tubular casing 4, having been previously fit onto the stuffing horn, is pulled over the calibrating pipe 2 in the direction of the arrow 16 and is simultaneously deshirred.

By turning the sizing disc 3 on the thread 25, the maximum circumference of the calibrating pipe 2 may be adjusted.

By varying the circumference of the calibrating pipe, correspondingly variable frictional forces are produced between the calibrating pipe and the inside wall of the deshirred tubular casing. These forces counteract the pressure exerted by the sausage mixture being forced into the casing and thus delay the withdrawal of the sausage casing. By controlling the size of the circumference of the calibrating pipe, the diameter of the filled sausages may be adjusted in a simple manner, without the necessity for utilizing calibrating pipes of different circumference.

Moreover, since the rim of the opening of the calibrating pipe is resilient, and thus has a variable circumference, variations in the circumference of the tubular casing, such as sections of reduced circumference resulting from changes in the conditions of manufacture, present little risk of the casing being damaged by the enlarged end of the calibrating pipe.

The following examples serve to illustrate the present invention. In all the examples, the tubular casing employed comprises regenerated cellulose with a paper insert, having a diameter of 108 mm.

EXAMPLE 1

A tubular casing 4 is filled with sausage composition, using a device which basically corresponds to that shown in FIG. 1, with the exception that the annular sizing element 3 is omitted. During the filling operation, the maximum outside diameter of the end 8 of the calibrating pipe 2 is reduced from 120 mm to 115 mm, while the tubular casing 4 is enlarged to a diameter of 115 mm at the end 8 of the calibrating pipe.

The sausages thus produced have a length of 1.50 m and a diameter of from 117 to 118 mm, achieved and maintained by appropriate adjustment of the braking elements 18. The filling time was 14 seconds for each sausage.

EXAMPLE 2

A tubular casing 4 is filled with sausage composition, using a device corresponding to that shown in FIG. 1. The end 8 of the calibrating pipe, which possesses a normal maximum outside diameter of 108 mm, is enlarged to 114 mm by means of the annular sizing element 3. This means that the tubular casing 4 is expanded to a diameter of 114 mm at the end 8 of the calibrating pipe.

The sausages thus produced correspond to those obtained in Example 1, the diameter of the sausages being achieved and maintained by appropriate adjustment of the braking element 18.

EXAMPLE 3

A tubular casing 4 is filled with sausage composition, using a device corresponding to that shown in FIG. 4. The diameter at the rim of the opening 24 is 108 mm. The sausages thus produced correspond to those obtained in Example 1, the diameter of 117 to 118 mm being achieved and maintained by the braking elements 18 shown in FIG. 1.

It is thus seen from the foregoing examples, that the present invention provides a particularly efficacious device for controlling the filling of tubular casings. Moreover, the present invention also provides a convenient means by which the effective circumference of the calibrating pipe may be conveniently adjusted. The calibrating device of the present invention is also highly suitable for use in forming a prepackaged shirred casing article in which the shirred casing is carried by the calibrating pipe, and a deshirred portion is drawn over the resilient enlarged end of the pipe.

While the invention has now been described in terms of certain preferred embodiments, and exemplified with respect thereto, the skilled artisan will readily appreciate that various modifications, changes, omissions and substitutions may be made without departing from the spirit thereof. It is intended, therefore, that the present invention be limited solely by the scope of the following claims.

What is claimed is:

1. A calibrating device for use with a stuffing machine having a stuffing horn for uniformly controlling the filling of a shirred tubular casing with a food composition flowing under pressure from said stuffing horn, comprising a hollow calibrating pipe having a central bore therethrough for mounting said calibrating pipe on said stuffing horn, and having an enlarged circumference at one end thereof which stretches said casing and applies a frictional force thereto as said casing is drawn over said calibrating pipe during the filling of said casing, at least that portion of said calibrating pipe having said enlarged circumference being formed of a resilient material, wherein said calibrating pipe is of a length sufficient to carry an entire length of shirred tubular casing, said calibrating device further comprising means for securing said casing to said calibrating pipe at the end thereof opposite said enlarged end, wherein said calibrating pipe has depressions therein at the end opposite said enlarged end, and said means for securing said casing to said pipe comprises a ring having projections which engage the depressions in said pipe to secure said casing thereon.

2. The device of claim 1, further comprising means for adjustably varying the circumference of the resilient enlarged end of said calibrating pipe.

3. The device of claim 2, wherein said circumference varying means comprises an annular sizing element adapted to be movably seated on said stuffing horn within the resilient enlarged end of said calibrating pipe, the movement of said annular sizing element within said enlarged end functioning to change the circumference of the enlarged end of said calibrating pipe by engagement therewith.

4. The device of claim 3, wherein said annular sizing element comprises an annular disc having a circumference which is smaller than the circumference of the enlarged end of the calibrating pipe.

5. The device of claims 1 or 2, wherein the enlarged end of said calibrating pipe has a circumference which is larger than the circumference of unshirred, unstretched casing, and is smaller than or equal to the desired circumference of a filled casing.

6. The device of claims 1, 2, or 3, in which the enlarged end of said calibrating pipe is flared out.

7. The device of claim 1, wherein the enlarged end of said calibrating pipe comprises an outwardly projecting flange section, and connected thereto a cylindrical section which extends in the direction of the end of the calibrating pipe.

8. The device of claim 7, wherein said cylindrical section is flared out from said flange.

9. The device of claim 8, wherein said cylindrical wall has longitudinal elevations and depressions extending from said flange to the end of said calibrating pipe.

10. The device of claim 1, wherein said calibrating pipe has perforations therein.

11. The device of claim 1, wherein the circumference of said calibrating pipe increases continuously from one end to the other.

12. The device of claim 3, wherein said calibrating pipe and/or said annular sizing element are movably mounted on said stuffing horn.

13. The device of claim 12, wherein said annular sizing element is movably seated on a threaded pipe section disposed within the enlarged end of said calibrating pipe.

14. The device of claim 13, wherein said calibrating pipe further comprises a threaded pipe section which sits within the enlarged end of said calibrating pipe and is integral therewith.

15. The device of claim 3, wherein said annular sizing element is secured to said stuffing horn.

16. The device of claim 15, further comprising means for biasing said calibrating pipe into engagement with said annular sizing element.

17. The device of claim 16, wherein said biasing means comprises an adjustable stop and a spring.

* * * * *